April 12, 1927.

F. H. JOHNSON ET AL

1,624,250

LEER CHARGING APPARATUS

Filed March 19, 1925

F. H. JOHNSON ET AL 1,624,250

LEER CHARGING APPARATUS

Filed March 19, 1925

Inventors

Fred H. Johnson.
Sherman R. Lathrop.

By Larry Lacey, Attorneys

Patented Apr. 12, 1927.

1,624,250

UNITED STATES PATENT OFFICE.

FRED H. JOHNSON AND SHERMAN R. LATHROP, OF SAPULPA, OKLAHOMA.

LEER-CHARGING APPARATUS.

Application filed March 19, 1925. Serial No. 16,834.

This invention relates to means for transferring glass articles from the forming machine to the annealing or hardening furnace, and its object, stated generally, is to provide automatic mechanism which will be free of complicated arrangements whereby the articles will be received from the molds or forming apparatus and transferred to and delivered upon the moving element of a leer or annealing furnace without injury. Another object of the invention is to provide an apparatus for the stated purpose in which the formed articles will be conveyed to the leer continuously and deposited upon the moving element of the leer in regular order without losing a great proportion of their latent heat. Another object of the invention is to provide a conveyer of such construction that it will present a continuous support for the articles but may readily accommodate the movement around an actuating element so that, while the constituent parts of the conveyer may move relative to each other, there will be no shifting or dropping of the articles upon the conveyer. Another object of the invention is to provide means for positively unloading the articles from the conveyer onto the moving element of the leer, and a further object of the invention is to provide means whereby the unloader will be permitted to yield to the articles in the event that any article should encounter a high part of the moving leer element and breakage of any of the operating mechanism will be thereby avoided. Another object of the invention is to provide a conveyer which moves continuously in one direction and an unloader which will cooperate with the conveyer to remove the articles therefrom but which will travel in opposition to the conveyer through such an interval of time as may be needed to remove the articles and place them in a row transversely of the leer and then return to its starting point so as to again act upon the articles to form another row thereof in the leer. All these stated objects, and such other objects as will incidentally appear in the course of the following description, are attained in such a mechanism as is illustrated in the accompanying drawings, and the invention resides in certain novel features which will be particularly pointed out in the appended claims.

Figures 1, 8, 12:
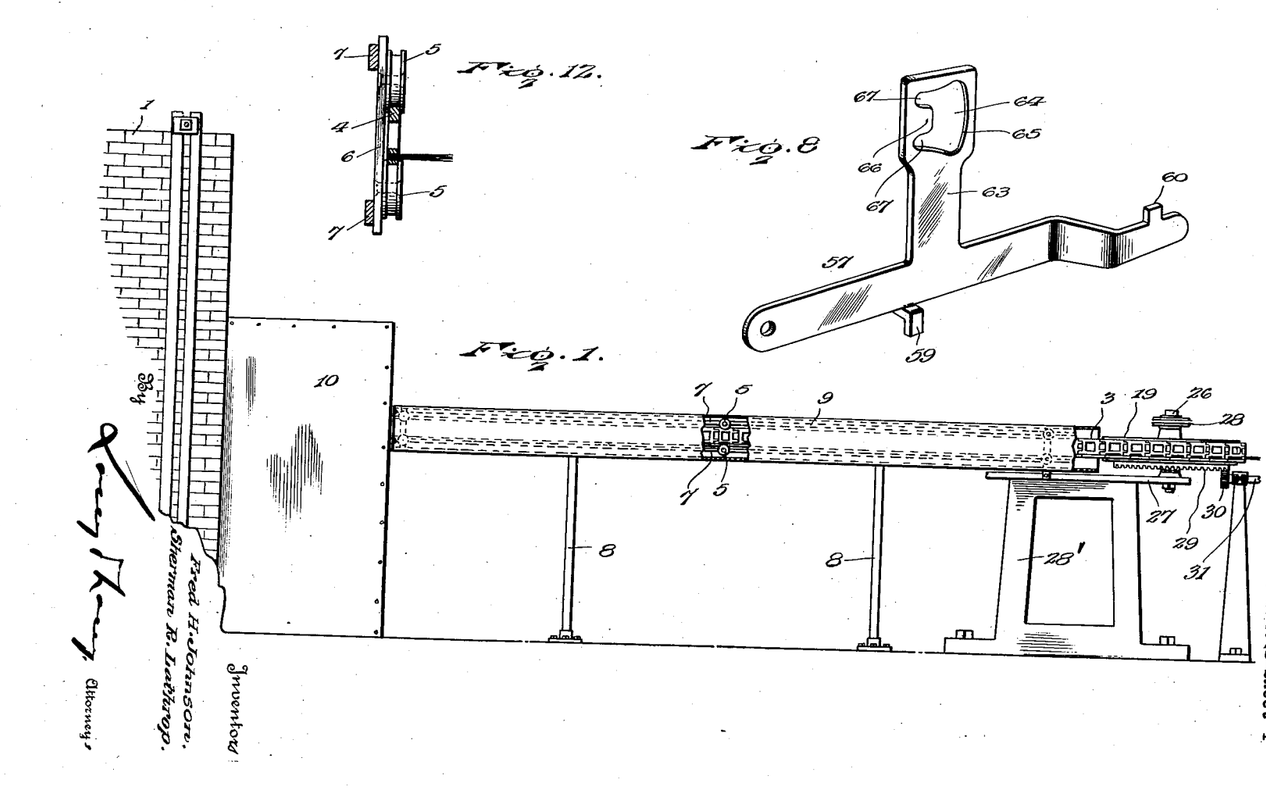
Figure 1 is a side elevation, partly broken away and in section, of one embodiment of our invention.
Fig. 8 is a detail perspective view of the reversing lever or latch.
Fig. 12 is a detail section of a portion of the main conveyer on the line 12—12 of Fig. 2.
Figure 2:
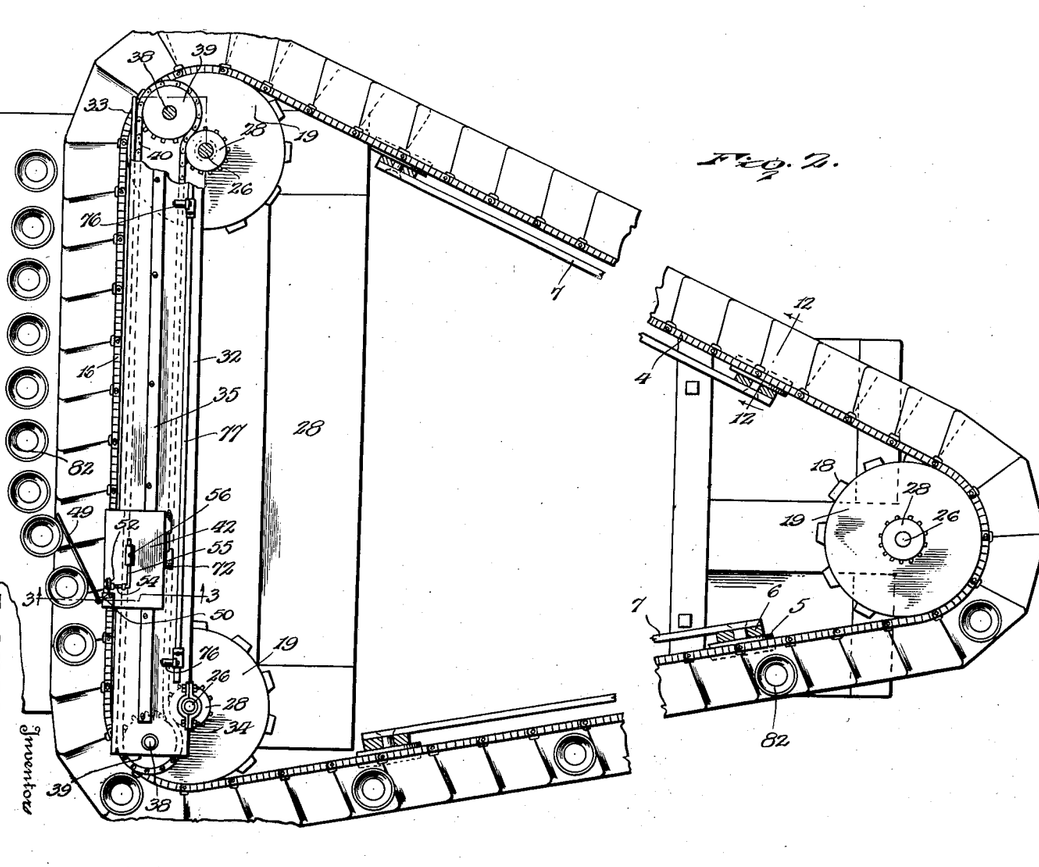
Fig. 2 is a plan view, with parts in section, of the apparatus shown in Fig. 1, Fig. 2 being on a somewhat larger scale and the casing or covering for the working elements being omitted.

Referring to Figs. 1 and 2, the reference numeral 1 indicates more or less conventionally a portion of a leer or annealing furnace which may be of any approved form and is generally of a type in which the moving element is an endless apron 2. Our invention comprises primarily an endless conveyer identified as an entirety by the reference numeral 3 in Fig. 1 and arranged to receive the formed articles from the molding or other forming machine and carry them to the leer. For convenience, in the following description that portion of the conveyer which is more remote from the leer will be referred to as the rear while that portion which is adjacent the leer will be referred to as the front.

Figure 9:
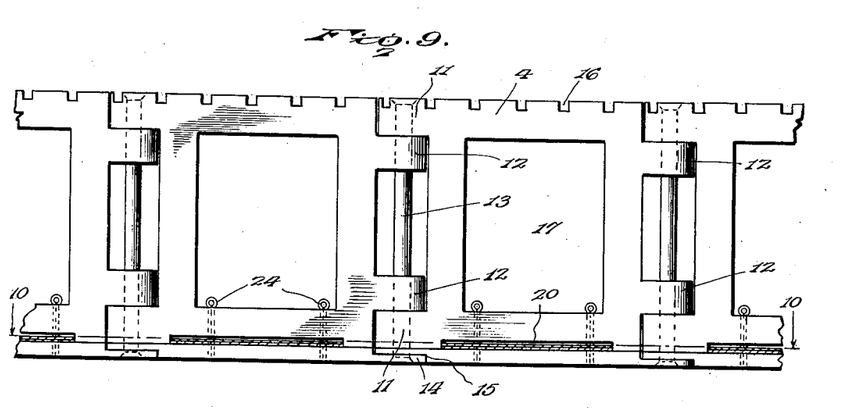
Fig. 9 is an enlarged side elevation, with parts in section, of the main conveyer.
Figure 10:
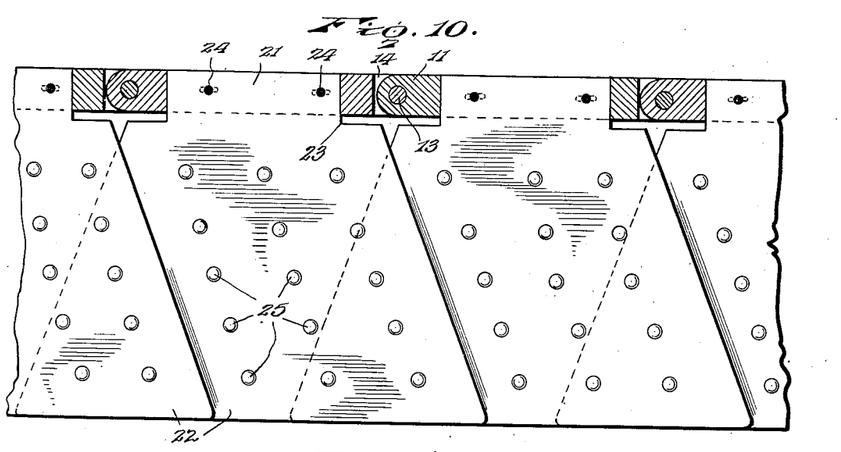
Fig. 10 is a view, partly in plan and partly in horizontal section, on the line 10—10 of Fig. 9.
Figure 11:
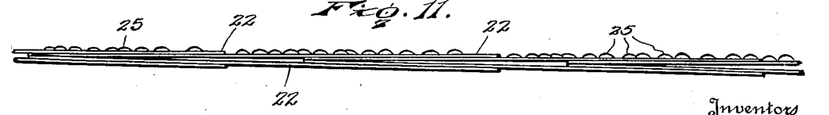
Fig. 11 is an edge view of the conveyer plates.

The conveyer 3 comprises an endless chain consisting of plates 4 set on edge so as to work in vertical planes and pivotally connected at their adjacent side edges. The chain is supported in its vertical position by flanged or grooved rollers 5 which are arranged at intervals in pairs with the members of the pairs vertically alined so as to engage the upper and lower edges respectively of the several chain plates, as shown most clearly in Fig. 12, the rollers being mounted upon connecting plates or brackets 6 which are rigidly secured to upper and lower horizontal bars 7. The bars 7 are secured in any convenient or preferred manner to standards 8 which are erected upon the ground or floor of the factory and may be adjusted vertically in any desired way so as to compensate for irregularities in the floor or other fixed supporting surface and maintain the bars 7 in horizontal planes. A casing 9 is preferably secured to the standards and the bars 7 so as to enclose the conveyer to prevent damage thereto and also to house the formed articles as they are carried to the leer by the conveyer and thereby minimize the dissipation of the heat in the articles. A housing 10 is connected with the casing 9 at the front end of the latter, and this housing 10 is so arranged as to abut the leer 1 and extend across the rear end thereof so as to enclose all the working parts immediately adjacent the leer. The chain plates 4, as shown most clearly in Fig. 9, are each provided at one side edge with lugs 11 at the top and bottom of the plate and at the opposite side edge are provided with similar lugs 12 which are spaced below and above the top and bottom edges of the plates respectively to fit between the lugs 11 of an adjacent plate and be hingedly or pivotally connected therewith by pintles 13 inserted through the mating lugs, as clearly shown in Fig. 9. To further guard against relative vertical movement of adjacent chain plates, each plate is provided with a longitudinally extending tongue 14 at its lower edge and at that side carrying the lugs 12, and the lower lug 11 is recessed, as shown at 15, to fit over the said tongue, as shown clearly in Fig. 9. In the upper edges of the chain plates, transverse notches 16 are formed at regular intervals for a purpose which will presently appear. The chain plates are provided with large openings 17 in their central portions whereby they may be easily engaged by the sprocket teeth 18 of driving sprocket wheels 19 which are mounted to rotate in horizontal planes and thereby impart motion to the conveyer chain in an obvious manner. In the lower portion of each chain plate, but above the lower edge thereof, is a longitudinally extending slot or opening 20, and in these openings are received the tangs 21 of the conveyer plates 22. The said conveyer plates 22 extend laterally at each side of the tang 21, as shown at 23 in Fig. 10, and the outer portions of the plates are trapezoidal in form, as also shown in Fig. 10. The conveyer plates are arranged in pairs so that a pair of plates is engaged in the slot or opening 20 of each chain plate and they are secured in the said slots or openings by cotter pins or the like, 24, inserted through opener pins or the like 24 inserted through openings provided therefor in the bodies of the respective chain plates and through the tangs 21 of the conveyer plates. As shown most clearly in Figs. 10 and 11, the conveyer plates are of such dimensions that the meeting edges of the adjacent plates overlap, and we arrange the plates so that the forward edges of each pair of plates will extend between the rear edge portions of the immediately preceding pair of conveyer plates, this arrangement overcoming the possibility of an edge of a conveyer plate being presented to the moving element of the leer and thereby minimizing the possibility of the conveyer plates impinging squarely upon a projecting portion of the moving element of the leer. The trapezoidal form of the conveyer plates, together with the overlapping interengaging arrangement of their adjacent edges, furnishes a continuous surface to receive and support the formed articles and permits the plates to move longitudinally of the conveyer relative to each other when they are passing around the driving sprocket wheels without becoming entirely separated so that the formed articles deposited upon the conveyer will be carried around the turns without being apt to be dropped. The vertical dimensions of the several slots or openings 20 are somewhat greater than the thickness of the plates engaged therein so that the conveyer plates will have a limited vertical movemet at their outer ends and will be thereby permitted to ride over any slight irregularities in the surface of the moving element of the leer. The conveyer plates are preferably sheet metal so that, while they will be strong enough to firmly support the articles placed thereon, they will be durable and will have more or less resiliency so that, if the moving element of the leer, such as the apron 2, should be warped, the conveyer plates may readily yield to the irregular surface of the leer and ride over the same without clogging the operation of the machine. In order that the metal conveyer plates may not rapidly draw heat from the formed articles, small teats, indicated at 25, may be struck up or formed in the upper conveyer plates to minimize the area of contact between the plates and the articles while at the same time providing a firm support for the articles.

In the form of the invention shown in Figs. 1 to 8, three driving sprocket wheels 19 are employed and they are arranged in triangular relation, as shown in Fig. 2. These sprocket wheels each engages the conveyer chain so that they aid in supporting the conveyer and also actuate the same in an even steady manner. The sprocket wheels are mounted upon spindles 26 which are secured in brackets 27 carried by pedestals 28' of any approved design, and upon the upper side of each driving sprocket wheel is formed or secured a supplemental sprocket wheel 28 which is of much less diameter, as shown clearly in Fig. 2. Upon the under side of each sprocket wheel 19 is a gear 29 so that the sprocket wheels are interchangeable and it is not necessary to locate any particular sprocket wheel upon any particular spindle 26. Motion is imparted to the sprocket wheels and from them to the conveyer and the other working parts by a pinion 30 on the end of a driving shaft 31 which may be actuated by any convenient motor. In Fig. 1, we have shown the driving shaft and its pinion arranged at the rear end of the conveyer, but it is to be understood that it may be disposed so as to directly drive any one of the driving sprockets as may be best adapted to any given circumstances.

Figure 3:
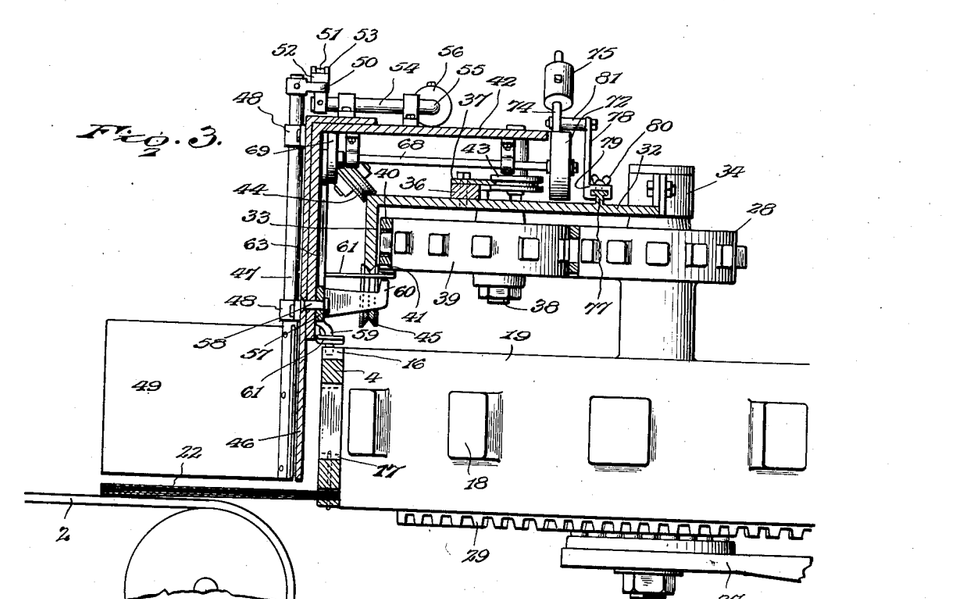
Fig. 3 is an enlarged vertical section on the line 3—3 of Fig. 2.
Figure 4:
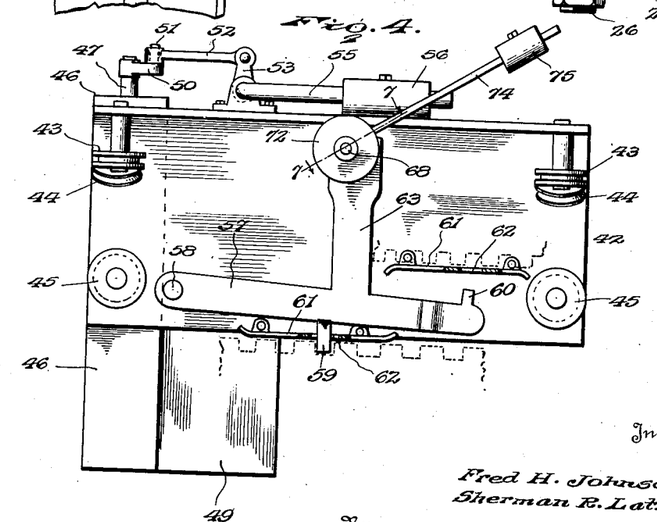
Fig. 4 is a rear elevation of the carrier shown in Figs. 2 and 3.

Secured to the upper ends of the spindles 26 at the front end of the conveyer is a frame plate 32 which extends forwardly from the spindles and is provided at its front edge with a depending web or rail 33 extending parallel with the rear of the leer, the angle formed by the main portion of the frame plate and the pendent rail 33 being a right angle and the corner presented thereby being disposed parallel with the leer. The said frame plate may be mounted upon the spindles 26 in any approved manner, and we have shown split clamping collars 34 encircling the spindles and secured thereto by clamping bolts inserted through their mating flanges in a well-known manner. Upon the upper side of the frame plate 32 is secured a track 35 consisting of a bar 36 extending from end to end of the plate parallel with its front edge and a flat rail 37 secured upon the said bar and overhanging the rear edge of the same, as shown clearly in Fig. 3. Adjacent the ends of this frame plate 32, spindles 38 are secured therein and depend therefrom, and upon these spindles are mounted idler sprockets 39 which are disposed adjacent the auxiliary sprockets 28, a chain 40 being trained about the said sprockets 39, as shown in Fig. 2, and meshing with the sprockets 28 so that motion is imparted to the chain by the latter. The chain 40 may be of any preferred form and the several links thereof are provided with transverse notches 41 in their lower edges for a purpose which will presently appear A carrier 42 is mounted to travel upon the frame plate 32 and consists, generally stated, of an angle plate or bar presenting a horizontal web or member fitting over the front portion of the frame plate 32 and a vertical member or web depending from the front edge of the horizontal web in front of and in spaced relation to the vertical web 33 of the frame plate. At the ends of the carrier are provided grooved rollers 43, 44 and 45 which are adapted to engage the several tracks formed by and arranged upon the frame plate whereby the carrier will be guided in its travel and will be held against accidental detachment from the frame plate. The rollers are carried upon spindles or brackets of any approved form secured in the carrier and the rollers 43 are disposed adjacent the rear edge of the carrier so as to engage the rear overhanging edge of the track plate 37, while the rollers 44 are disposed obliquely and engage the forward corner of the frame plate and the rollers 45 are arranged vertically to engage the lower edge of the web 33, all as clearly shown in Fig. 3. It will be readily seen that these rollers permit the carrier to travel readily upon the frame plate but prevent accidental dislodgement. A bracket 46 is mounted upon the carrier and it may be secured at any point in the length of the same as may be found most desirable in any particular instance. This bracket may be of any convenient form and is shown as a flat plate secured against the front side of the carrier and having its upper extremity extending rearwardly so as to overlie the carrier and be secured upon the top of the same. A stem 47 is mounted in keepers or bearings 48 upon the bracket 46 so that the stem may rock in a horizontal plane, and to the lower end of the stem is rigidly secured the unloader blade 49 which normally extends obliquely forward from the stem, as shown in Fig. 2. This unloader blade consists of a plate set on edge and disposed over the conveyer plates 22 and of such dimensions that in its normal position the free end of the blade will be immediately over or close to the outer edges of the conveyer plates. Upon the upper end of the stem 47 is formed or secured a crank 50 which projects rearwardly over the carrier and is fitted with a vertically disposed stud 51 at its free end on its upper side. Pivotally engaged upon the stud 51 is a link 52 which extends longitudinally of the carrier and is, in turn, pivotally connected with a normally upstanding crank 53 at the front end of a rock shaft 54 journaled in suitable bearings upon the top of the carrier and having its rear end formed into or equipped with an elongated crank arm or lever 55. A weight 56 is adjustably secured upon this lever 55 and it should be of such size and set at such point of the lever that normally it will rest upon the carrier, as shown in Figs. 3 and 4, and will hold the unloader blade 49 in an outstanding position, as shown in Figs. 2 and 3. Should the article being unloaded strike an abnormally high part in the leer apron and tend to clog, the blade 57 will yield or swing rearwardly, thereby lifting the weight 56 and permitting the unloader blade to pass by the obstructed article so that breaking of parts will be prevented. As soon as the obstructed article has been cleared, the weight will obviously return to its normal position and the unloader blade will operate as before. It will be understood, of course, that the article which tended to resist the unloading action of the blade 49 will have obtained a supporting engagement with the leer apron before the choking action occurred so that, notwithstanding the yielding of the blade, the article will be drawn from the conveyer and will be carried through the leer in the usual manner.

Figure 5:
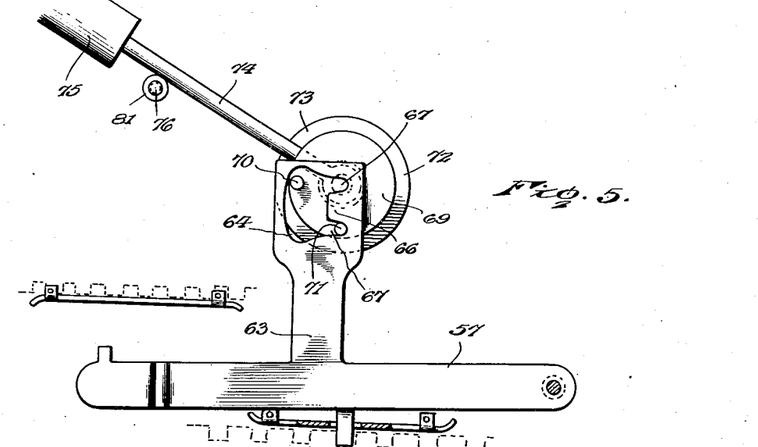
Figs. 5 and 6 are elevations showing different positions of the reversing mechanism.
Figures 6, 7:
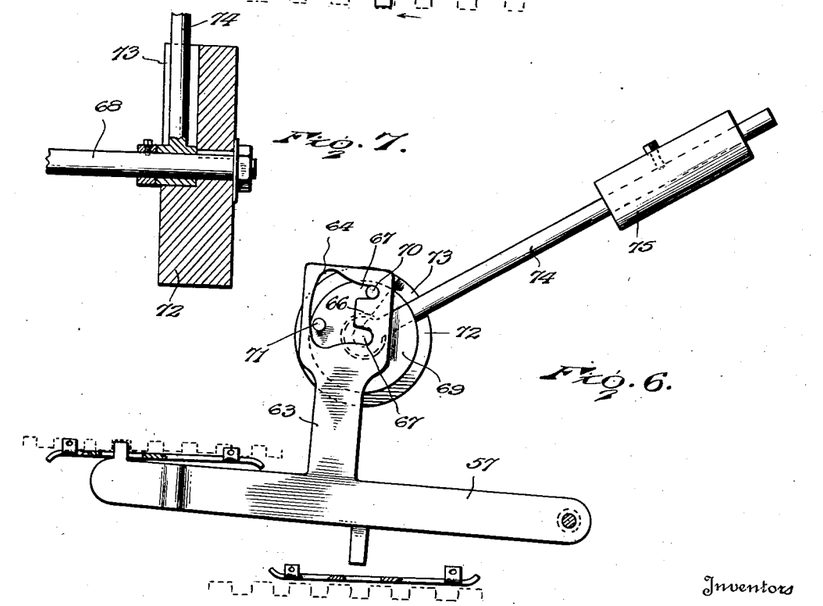
Fig. 7 is an enlarged detail section on the line 7—7 of Fig. 4.

The carrier 42 with the unloader is caused to travel in one direction by the main conveyer chain and in the opposite direction by the chain 40, and to effect engagement with the proper chain a reversing and clutching lever is mounted upon the vertical web of the carrier and on the rear side thereof. This reversing and clutching lever 57 is pivoted at one end, as indicated at 58, upon the vertical web of the carrier 42 and extends substantially longitudinally of the carrier between the horizontal planes of the respective chains, being equipped on its lower edge with a tooth 59 adapted to engage one of the notches 16 in the main conveyer chain and being equipped on its upper edge with a similar tooth 60 adapted to engage one of the notches 41 in the lower edge of the chain 40, shoes 61 being secured upon the carrier above and below the lever 57 and projecting rearwardly therefrom so that the respective teeth 59, 60, will be prevented from interfering with the movement of the respective chains when the lever is set in neutral position or between the two shoes. The shoes are, of course, provided with openings, as 62, through which the respective teeth may pass to engage the proper chain when the carrier is to travel. Between the ends of the lever 57, an arm 63 rises therefrom, and this arm is provided at its upper end with a laterally expanded or widened portion having an opening or slot 64 formed therethrough. As shown in Figs. 5, 6 and 8, the slot or opening 64 is substantially U-shaped in outline having one elongated side edge 65 and provided at its opposite side with an intermediate lug or tooth 66 defining upper and lower notches 67 between itself and the upper and lower edges, respectively, of the slot. A reversing shaft 68 is mounted in suitable bearings on the under side of the top member of the carrier and upon the front end of this reversing shaft is secured a reversing disk 69, upon the front face of which are forwardly projecting studs or pins 70 and 71 which are arranged adjacent the periphery of the disk and spaced apart ninety degrees circumferentially of the disk. These pins or studs 70 and 71 play in the slot or opening 64 of the arm 63 and are adapted to engage the upper and lower notches 67 respectively, thereby serving to reverse the lever 57 and to lock the same in the position in which it is set. Upon the rear end of the reversing shaft 68 is secured a disk 72 which is provided in its front face with a V-shaped recess 73. A lever 74 is mounted loosely upon the reversing shaft and extends outwardly therefrom through the recess 73 and is equipped with an adjustable weight 75. Assuming the parts to be in the position shown in Fig. 5, it will be understood that the carrier is traveling with the main conveyer chain in the direction indicated by the arrow so that it is being returned to its starting point, the lever 74 projecting forwardly in the direction of travel and the pin or stud 71 being engaged in the lower notch 67 and locking the lever 57 against any vertical movement. Upon the top of the frame plate 32 stops 76 are provided in the path of the lever 74, and in Fig. 5 the lever is shown as engaging one of these stops. As the travel of the lever continues, it will be swung upwardly about the reversing shaft 68 through its engagement with the stop 76 in an obvious manner. The initial movement of the lever 74 will be without any direct effect upon the reversing shaft and the reversing and clutch lever 57 so that premature stoppage and reversal of the carrier will be avoided. However, the upward swinging movement of the lever 74 will quickly bring it into engagement with the remote wall of the recess 73, whereupon the disk 72 will be rocked and, inasmuch as the disk is secured to the reversing shaft 68, the movement will be transmitted to the shaft. The disk 69 will, of course, move with the reversing shaft and, therefore, the pin or stud 71 will be carried out of engagement with the lower notch 67. Just as the pin or stud 71 is free of the notch 67, the stud 70 will come into contact with the upper end wall of the slot or opening 64 and will thereupon lift the arm 63 and swing the clutch lever 57 upwardly. The tooth 59 will be thereby withdrawn from its engagement with the main conveyer chain and momentarily the carrier will be at rest. However, the lever 74 will, by this time, have passed the vertical plane of the reversing shaft so that it will then swing to the position shown in Fig. 6 under the influence of gravity. This continued movement of the reversing lever will be transmitted directly to the disk 72 and through the same to the shaft 68 so that the pin 70 will be carried into engagement with the upper notch 67 and will lock the clutch lever in its raised position. When the clutch lever has reached its uppermost position, the tooth 61 will be in engagement with the drive chain 40, as shown in Fig. 6, whereupon the carrier will again travel in the direction to unload the articles upon the conveyer plates.

The stops 76 may be of any convenient construction and are intended to be set at any desired points in the length of the frame plate 32. We have shown a rail 77, T-shaped in cross section, secured upon the top of the frame plate 32 parallel with the track 35. The stop comprises a post 78 provided at its lower end with a clamp head 79 adapted to engage around the T rail 77, as shown clearly in Fig. 3, and secured thereon by a winged bolt or screw 80. These stops may obviously be set at any desired points of the rail 77 and their locations will be determined by the extent of travel to be permitted the carrier. The upper ends of the post 78 carry laterally extending rollers 81 which project into the path of the lever 74 so that the lever will engage a stop at each end of its movement and will be automatically operated to reverse the travel of the carrier.

The articles which are to be delivered into the leer are indicated at 82 in Fig. 2. They may be tumblers, vases, or any other articles of glass or other similar material which ordinarily is shaped in a molding machine or the like and are then transferred to a furnace to be annealed, baked or otherwise hardened. The main conveyer travels at a much greater speed than the carrier when the articles are being unloaded and the operation is so timed that, while the articles may be spaced a considerable distance apart upon the main conveyer they will be delivered close together upon the leer apron and will be arranged in rows transversely of the leer apron and almost at a right angle to the side edges of said apron. For unloading the articles from the main conveyer, the carrier is engaged with the chain 40 so that it travels in opposition to the main conveyer and will, therefore, meet the articles upon the conveyer and push them successively from the conveyer onto the leer apron. When the carrier reaches the set limit of its travel in the unloading direction, the clutch lever is automatically released from the chain 40 and engaged with the main conveyer chain, in the manner previously described, so that the carrier will then be caused to travel in the opposite direction to the starting point of its operation and then again automatically disengaged from the main conveyer chain and engaged with the chain 40 so that the unloading operation will be repeated. It will thus be seen that the operation of the machine is entirely automatic after it has once been started and it may be continued without interruption as long as there are any articles to be conveyed over the molding apparatus to the leer.

The form of the invention which has been described is intended more particularly for leers of some appreciable width. When the leer is narrow so that it will not accommodate many articles in transverse rows, the arrangement illustrated in Figs. 13 and 14 may be employed. This embodiment of the invention differs from the first described embodiment primarily in substituting for the two driving sprocket wheels 19 arranged adjacent the leer a single large sprocket wheel 83. This sprocket wheel 83 is mounted upon a pedestal 84 equipped with a bracket 85 to receive a spindle 86 and it projects over the leer apron 87 so that the main conveyer 88, corresponding in all respects to the main conveyer heretofore described, will be in a position to deliver the several articles directly upon the leer apron. The sprocket wheel 83 is fitted about the vertical spindle 86 and actuates the conveyer just as the driving sprocket wheel 19 actuates the conveyer in the first described form of the apparatus. The hub 89 of the sprocket wheel 83 is extended above the top of the wheel and has secured to its upper end a pinion 90 while below its upper end and slightly above the plane of the upper side of the wheel the hub is formed with an annular shoulder 91 upon which rests the head 92 of an unloader lever or bar 93. This unloader lever or bar 93 extends to a point immediately over the periphery of the sprocket wheel and over the main conveyer, and a bracket 94 is secured to the outer extremity of the lever or bar which rests upon the upper edge of the rim of the wheel. An unloader blade 95 is carried by the bracket 94 so that it may rock in a horizontal plane and is normally positioned over the main conveyer in exactly the same manner that the unloader blade 49 is positioned over the main conveyer. A crank arm 96 rises from the upper edge of the unloader blade 95 and projects therefrom toward and over the bracket 94 and the end of the unloader lever or bar 93. The bar 93 is formed with a strengthening rib 97 upon its upper side and pivoted to the said rib, or otherwise fulcrumed upon the lever or bar, is an angle lever 98 having its longer arm normally projecting outwardly and equipped with a weight 99. A link 100 connects the shorter arm of the angle lever with the end of the crank arm 96 so that, while the weight 99 holds the unloader blade normally outward from the periphery of the driving sprocket wheel, in the event of a tendency of an article to choke during the unloading action, the unloader blade may swing inwardly toward the sprocket wheel and clear the obstruction, being automatically returned to its working position through the force of gravity acting upon the weighted lever.

Figure 13:
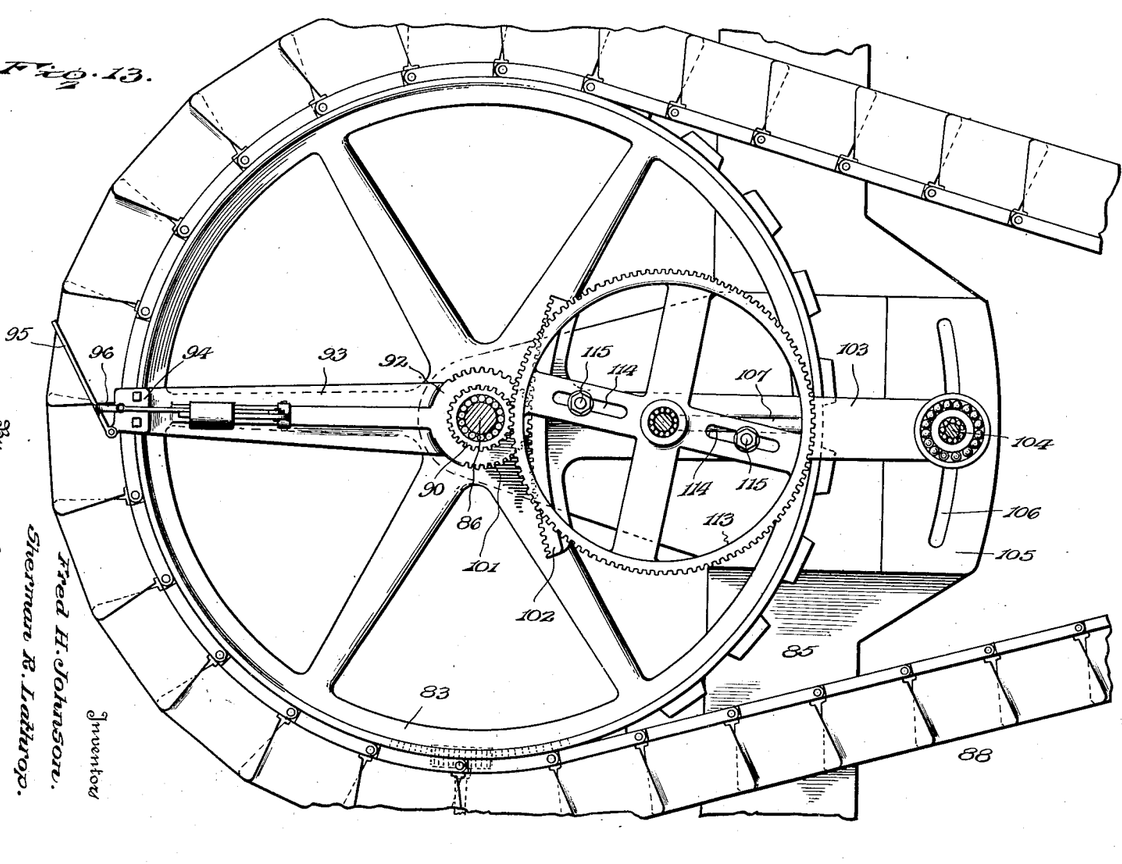
Fig. 13 is a plan view of an embodiment of the invention designed more particularly for use in connection with narrow leers.
Figure 14:
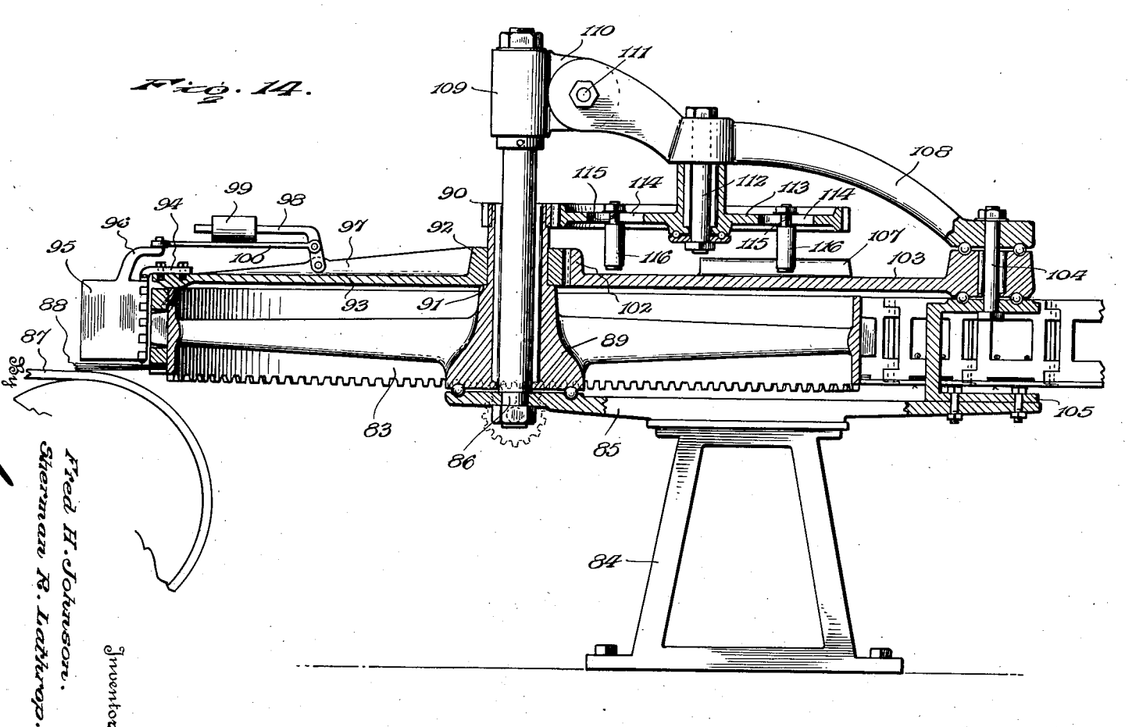
Fig. 14 is a central vertical section of the mechanism shown in Fig. 13.

Upon the periphery of the head 92 are formed gear teeth 101 which mesh with a segmental gear 102 formed on one end of a rocking arm 103 which is fulcrumed upon a spindle 104 carried by a bracket 105 secured upon the main supporting bracket 85. This bracket 105 is constructed with an arcuate slot 106 concentric with the spindle 86 so that the spindle 104 may be adjusted as may be necessary to obtain an accurate movement of the arm 103 and the unloader lever. Upon the upper side of the arm 103 is a short longitudinal rib or thrust member 107. Extending between and supported by the spindles 86 and 104 is a frame bar 108 which is fitted directly over the upper end of the spindle 104 but is engaged with the spindle 86 through a collar or sleeve 109 which encircles the latter spindle. The said collar or sleeve is provided with a lug 110 to which the adjacent end of the bar 108 is pivotally attached, as indicated at 111, thereby permitting the bar to be adjusted pivotally in a vertical plane so that the proper movement of the unloader and the parts for actuating the same may be accurately attained. Depending from the bar 108 between the ends thereof is a spindle 112 upon which is fitted a gear wheel 113 having radial slots 114 formed in alined spokes, this gear wheel meshing with the pinion 90, as shown. Impacts studs 115 depend from this gear wheel 113 and are adjustably secured in the slots 114, these studs being arranged to ride against the impact rib 107 so that they will successively engage said rib and swing the arm 103 to one side. Rollers 116 are fitted about the lower portions of the studs 115 so as to minimize the frictional wear upon the studs and the impact rib 107.

In the operation of this form of the invention, the articles to be delivered into the leer are placed upon the main conveyer 88 as they are drawn or discharged from the molding apparatus and are successively engaged by the unloader blade to be pushed from the main conveyer onto the leer apron. The rotation of the main sprocket wheel 83 is transmitted through the pinion 90 to the gear wheel 113 and the rotation of the gear wheel 113 obviously causes one of the studs 115 to ride into contact with the thrust member 107, pushing said member and the bar 103 to one side until the stud clears said member. The motion imparted to the bar 103 will be transmitted through the segmental gears 102 and 101 to the unloader lever so that the unloader blade will be caused to travel in opposition to the travel of the main conveyer. When the stud 115 clears the thrust member or rib 107, the bars 93 and 103 are, of course, free to return to the initial positions and will be returned through the frictional engagement between the wheel 83 and the outer end of the unloader lever 93, the movement being accomplished quickly so that the thrust member will be engaged by the formerly inactive stud 115 and the operation repeated.

Having thus described the invention, we claim:

1. In an apparatus for the purpose set forth, the combination of a main conveyer, a carrier arranged in proximity to the main conveyer, an unloader blade pivoted at one end to the carrier and extending laterally therefrom across the conveyer whereby to push articles laterally from the conveyer, means for causing travel of the carrier longitudinally of the conveyer, and means mounted upon the carrier and connected with the unloader blade for yieldably holding it across the conveyer.

2. In an apparatus for the purpose set forth, the combination of a main conveyer, an unloader arranged above the conveyer, a carrier for the unloader, a drive chain disposed adjacent the carrier and traveling in a direction opposite to the direction of travel of the main conveyer, a clutch element on the carrier to engage said chain or the main conveyer, means for automatically shifting said clutch element and thereby reversing the travel of the carrier at each limit of its movement, and means for locking the clutch element in its shifted position.

3. In an apparatus for the purpose set forth, the combination of a main conveyer, an unloader disposed above the conveyer to cooperate therewith, a carrier for said unloader, the unloader comprising a stem mounted for rocking movement upon the carrier, and a blade carried by the stem and extending across the main conveyer, a crank arm at the upper end of the stem, a weighted lever mounted upon the carrier, and connections between the lever and the crank arm whereby to yieldably hold the unloader blade across the main conveyer.

4. In an apparatus for the purpose set forth, the combination of a main conveyer including an endless chain, a carrier mounted above the main conveyer, a drive chain arranged above the main conveyer, an unloader mounted upon the carrier and arranged to cooperate with the main conveyer to remove articles therefrom, means for simultaneously continuously driving both chains, a clutch mounted upon the carrier and disposed between the two chains, means upon the carrier for causing the clutch to engage one of the chains and effect travel of the carrier, and means adjacent the path of the carrier for reversing the clutch at each limit of movement of the carrier.

5. In an apparatus for the purpose set forth, a conveyer including an endless chain provided with transverse notches in its upper edge, a drive chain disposed above the conveyer chain and provided with transverse notches in its lower edge, means for continuously actuating both chains, a carrier, an unloader mounted upon the carrier to cooperate with the main conveyer for removing articles therefrom, a clutch member mounted upon the carrier and having elements adapted to engage the respective chains, and means for actuating the clutch member to effect engagement with one or the other chain and thereby control the direction and extent of travel of the carrier and the unloader.

6. In an apparatus for the purpose set forth, the combination of a main conveyer including an endless chain, a drive chain disposed above the conveyer chain, means for effecting continuous travel of the two chains in opposite directions, a carrier, an unloader mounted on the carrier to cooperate with the main conveyer for removing articles therefrom, a clutch lever mounted upon the carrier between the chains and having oppositely extending elements presented to the respective chains for engagement with the same, means on the carrier to effect engagement between one of the elements on the clutch lever and the adjacent chain, and stops arranged in the path of the carrier to act upon the said means and reverse the clutch lever.

7. In an apparatus for the purpose set forth, the combination of a main conveyer including an endless chain, a frame member disposed above the conveyer, a drive chain arranged adjacent the frame member, a carrier mounted for travel longitudinally of the frame member, an unloader mounted on the carrier to cooperate with the main conveyer, a clutch lever mounted upon the carrier and adapted to engage either chain, a reversing shaft mounted upon the carrier, operative connections between the reversing shaft and the clutch lever, and stops arranged in the path of the carrier to act upon the reversing shaft at each limit of movement of the carrier.

8. In an apparatus for the purpose set forth, the combination of a main conveyer including an endless chain, a frame member above the conveyer, a drive chain adjacent said frame member and above the main conveyer, a carrier mounted for travel on the frame member, an unloader mounted on the carrier to cooperate with the main conveyer, a clutch lever mounted on the carrier and constructed to engage either chain, means for effecting engagement between the clutch lever and either chain, and shoes secured upon the carrier above and below the clutch lever and extending between the same and the respective chains.

9. In an apparatus for the purpose set forth, the combination of a main conveyer including an endless chain, a drive chain mounted above the main conveyer, a carrier arranged for travel above the two chains, an unloader mounted on the carrier to cooperate with the main conveyer, a clutch lever mounted on the carrier and arranged to engage either chain, a reversing shaft on the carrier operatively connected with the clutch lever, a weighted lever fitted upon an end of the reversing shaft, means whereby motion of said lever will be transmitted to the shaft, and stops adjacent the path of travel of the carrier arranged to be engaged by said lever whereby to limit the travel of the carrier and reverse the direction of the same.

10. In an apparatus for the purpose set forth, the combination of a main conveyer including an endless chain, a frame member above the conveyer, a driving chain adjacent said frame member, a carrier mounted for travel upon the frame member, an unloader on the carrier arranged to cooperate with the main conveyer, a clutch lever mounted upon the carrier and adapted to engage either chain, a reversing shaft mounted upon the carrier and having one end operatively connected with the clutch lever whereby to shift the same between the chains, a disk secured upon the opposite end of the reversing shaft, a weighted lever loosely fitted upon the shaft adjacent said disk and having a lost-motion engagement with the disk, and stops arranged at the ends of the travel of the carrier to be engaged by said lever and reverse the direction of travel of the carrier.

11. In an apparatus for the purpose set forth, the combination of a main conveyer including an endless chain, a frame member arranged above the conveyer, a drive chain disposed adjacent said frame member, means for continuously effecting travel of the two chains in opposite directions, a carrier mounted for travel upon the frame member, an unloader mounted on the carrier to cooperate with the main conveyer, a clutch mounted on the carrier to engage either chain, a reversing shaft mounted upon the carrier and operatively connected at one end with the clutch, a disk on the opposite end of the reversing shaft having a V-shaped recess extending from the shaft to its periphery, a weighted lever loosely mounted upon the reversing shaft and extending through said recess to engage either wall of the same, and stops arranged at the limits of travel of the carrier to be engaged by said lever whereby to effect reversal of travel of the carrier.

12. In an apparatus for the purpose set forth, the combination of a main conveyer including an endless chain, a frame member mounted above the conveyer, a drive chain adjacent said frame member, means for continuously driving said chains in opposite directions, a carrier mounted for travel upon the frame member, an unloader mounted on the carrier to cooperate with the main conveyer, a clutch lever mounted upon the carrier and arranged to engage either chain, a reversing shaft mounted on the carrier, means for rocking said shaft at the end of the travel of the carrier, an arm rising from the clutch lever, and means on the reversing shaft cooperating with said arm to shift the clutch lever and lock it in a set position.

13. In an apparatus for the purpose set forth, the combination of a main conveyer including an endless chain, a frame member arranged above the conveyer, a drive chain disposed adjacent said frame member, means for continuously driving the chains in opposite directions, a carrier mounted for travel upon the frame member, an unloader mounted on the carrier to cooperate with the main conveyer, a clutch lever mounted on the carrier to engage either chain, an arm rising from the clutch lever and provided at its upper end with an opening therethrough, and a tongue on one side wall of said opening, a reversing shaft on the carrier, means for rocking said shaft at each end of the travel of the carrier, and spaced elements carried by the adjacent end of the reversing shaft to engage the top and bottom walls of the opening in the arm rising from the clutch lever and seat respectively above and below the said tongue whereby to reverse the clutch lever and lock it in a set position.

In testimony whereof we affix our signatures.

FRED H. JOHNSON. [L. S.]
SHERMAN R. LATHROP. [L. S.]